(12) United States Patent
Zheng et al.

(10) Patent No.: US 10,740,469 B2
(45) Date of Patent: Aug. 11, 2020

(54) AUTOMATED SECURE SOFTWARE DEVELOPMENT MANAGEMENT, RISK ASSESSMENT, AND RISK REMEDIATION

(71) Applicant: FMR LLC, Boston, MA (US)

(72) Inventors: Erkang Zheng, Cary, NC (US); Jason Kao, Cary, NC (US); Bingrong He, Cary, NC (US)

(73) Assignee: FMR LLC, Boston, MA (US)

( * ) Notice: Subject to any disclaimer, the term of this patent is extended or adjusted under 35 U.S.C. 154(b) by 197 days.

(21) Appl. No.: 15/856,618

(22) Filed: Dec. 28, 2017

(65) Prior Publication Data

US 2019/0205542 A1 Jul. 4, 2019

(51) Int. Cl.
| | |
|---|---|
| *G06F 21/56* | (2013.01) |
| *H04L 29/06* | (2006.01) |
| *G06F 21/57* | (2013.01) |
| *G06F 8/70* | (2018.01) |
| *G06F 8/60* | (2018.01) |
| *G06Q 10/06* | (2012.01) |
| *G06F 8/41* | (2018.01) |
| *G06F 8/10* | (2018.01) |

(52) U.S. Cl.
CPC .............. *G06F 21/577* (2013.01); *G06F 8/10* (2013.01); *G06F 8/427* (2013.01); *G06F 8/60* (2013.01); *G06F 8/70* (2013.01); *G06Q 10/0635* (2013.01); *G06Q 10/06311* (2013.01)

(58) Field of Classification Search
CPC ......... H04L 63/14; G96F 21/577; G06F 8/00; G06F 2221/033; G06F 21/56
See application file for complete search history.

(56) References Cited

U.S. PATENT DOCUMENTS

| 8,091,065 B2 | 1/2012 | Mir et al. | |
|---|---|---|---|
| 8,392,999 B2 | 3/2013 | Adar | |
| 9,128,728 B2 | 9/2015 | Siman | |
| 9,448,787 B2 | 9/2016 | Rosomoff | |
| 2005/0273860 A1* | 12/2005 | Chess .................. | G06F 21/577 726/25 |
| 2009/0083695 A1* | 3/2009 | Mir ....................... | G06Q 10/06 717/104 |

(Continued)

*Primary Examiner* — Izunna Okeke
(74) *Attorney, Agent, or Firm* — Proskauer Rose LLP

(57) ABSTRACT

Methods and apparatuses are described for automated secure software development management, risk assessment and risk remediation. A server generates security requirements for a software application under development based upon a plurality of technical attributes and a threat model. The server creates a first set of development tasks based upon the generated security requirements. The server scans source code to identify one or more security vulnerabilities and creates a second set of development tasks based upon the identified vulnerabilities. The server generates a security risk score based upon the generated security requirements and the identified vulnerabilities. The server deploys the software application under development to a production computing system upon determining that the security risk score satisfies a criterion. The server generates security findings based upon operation of the software application after being deployed to the production computing system, and creates a third set of development tasks based upon the findings.

13 Claims, 5 Drawing Sheets

(56) References Cited

U.S. PATENT DOCUMENTS

| | | | |
|---|---|---|---|
| 2012/0254829 A1* | 10/2012 | Bhalla | G06F 8/34 717/105 |
| 2017/0091462 A1* | 3/2017 | Kurauchi | G06F 8/20 |
| 2017/0153873 A1 | 6/2017 | Banerjee et al. | |
| 2018/0121657 A1* | 5/2018 | Hay | G06F 21/577 |
| 2019/0114435 A1* | 4/2019 | Bhalla | G06F 21/55 |

* cited by examiner

FIG. 5

| $r_{12}$ | $r_{13}$ | $r_{14}$ | $r_{15}$ | ⋯ | $r_{1N}$ |
|---|---|---|---|---|---|
| 1 | $r_{23}$ | $r_{24}$ | $r_{25}$ | ⋮ | $r_{2N}$ |
| × | 1 | $r_{34}$ | $r_{35}$ | ⋮ | $r_{3N}$ |
| × | × | 1 | $r_{45}$ | ⋮ | $r_{4N}$ |
| × | × | × | 1 | ⋮ | ⋯ |
| × | × | × | × | ⋰ | $r_{N-1,N}$ |
| × | × | × | × | × | 1 |

Table 1. $N(N-1)/2$ possible ratios for a set of N weights

AUTOMATED SECURE SOFTWARE DEVELOPMENT MANAGEMENT, RISK ASSESSMENT, AND RISK REMEDIATION

TECHNICAL FIELD

This application relates generally to methods and apparatuses, including computer program products, for automated secure software development management, risk assessment, and risk remediation.

BACKGROUND

There are currently many different ways to perform a security assessment on a software application under development, whether it is a code review, a penetration test, or an assessment of the development process maturity. Examples include a Payment Application Data Security Standards (PA-DSS) assessment by the Payment Card Industry (PCI) Council or a Building Security In Maturity Model (BSIMM) assessment by Cigital, Inc.

However, these assessments present several challenges and drawbacks:

- Current assessment and scoring models are all points in time. They lack continuity and therefore long term meaning.
- They also only offer a "siloed" view. For example, a pen test result or code review result only represent a single technical perspective.
- The current scoring models are also too broad and not actionable. For example, BSIMM as an organizational measure and single score for the organization cannot effectively uncover issues at individual application and team level due to varying degrees of inconsistency that exist.
- Many secure development maturity assessments are often conducted through interviews which makes the results subjective.

Additionally, with the recent adoption of Agile development and DevOps practices, integrating security into development is becoming an increasingly challenging obstacle, due to the complexity and the amount of manual effort involved. In a large technology organization, there are often hundreds of development teams and thousands of applications being built, incorporating detailed security requirements and activities throughout the development lifecycle has become a daunting problem that is highly cost prohibitive and impractical with the current systems and methods. As a result, security continues to be an afterthought to many software development organizations, and the security team continues to struggle playing catch-up.

SUMMARY

Therefore, what is needed are methods and systems for automated secure software development management, risk assessment, and risk remediation. The techniques described herein provide a continuous, standardized, and holistic view of enterprise application security, including features such as automating the secure software development lifecycle with predictive scoring. The systems and methods receive input from multiple computing systems and apply a scoring model on application-characteristic information, then displays the results in an easily-digestible format. The system has the ability to integrate with various enterprise systems to aid in determining an application's security and overall risk on an ongoing basis.

Depending on the user characteristics, the system advantageously curates a user-specific view. These characteristics could include role across entire organizations, such as security teams, development teams, project managers, business product owners, and management. This view is also customizable for other user attributes, such as relevant applications. The current existing systems either address application level vulnerabilities, create threat modeling, generate security requirements based on threat analysis. All of them look at a single step of the software development cycle. The invention covers the full development cycle as well as design, implementation, creating an iterative loop into which different roles can involve, therefore reducing manual work, increasing workflow efficiency, approaching faster risk mitigation. Moreover, it is dynamic, automatic, and expandable to fit into various hierarchy structures, therefore can be standardized across different originations.

The invention, in one aspect, features a system for automated secure software development management. The system comprises a server computing device that generates security requirements for a software application under development based upon a plurality of technical attributes of the software application under development and a threat model associated with the software application under development. The server computing device creates a first set of development tasks in a software development issue tracking platform based upon the generated security requirements. The server computing device scans source code associated with the software application under development to identify one or more security vulnerabilities associated with the source code. The server computing device creates a second set of development tasks in the software development issue tracking platform based upon the identified security vulnerabilities. The server computing device generates a security risk score for the software application under development based upon the generated security requirements and the identified security vulnerabilities. The server computing device deploys the software application under development to a production computing system upon determining that the security risk score satisfies a predetermined criterion. The server computing device generates one or more security findings based upon operation of the software application after being deployed to the production computing system. The server computing device creates a third set of development tasks in the software development issue tracking system based upon the security findings.

The invention, in another aspect, features a computerized method of automated secure software development management. A server computing device generates security requirements for a software application under development based upon a plurality of technical attributes of the software application under development and a threat model associated with the software application under development. The server computing device creates a first set of development tasks in a software development issue tracking platform based upon the generated security requirements. The server computing device scans source code associated with the software application under development to identify one or more security vulnerabilities associated with the source code. The server computing device creates a second set of development tasks in the software development issue tracking platform based upon the identified security vulnerabilities. The server computing device generates a security risk score for the software application under development based upon the generated security requirements and the identified security vulnerabilities. The server computing device deploys the software application under development to a production computing system upon determining that the security risk score satisfies a predetermined criterion. The server computing device generates one or more security findings based upon operation of the software application after being deployed to the production computing system. The server computing device creates a third set of development tasks in the software development issue tracking system based upon the security findings.

The invention, in another aspect, features a computer program product, tangibly embodied in a non-transitory computer readable storage device, for automated secure software development management. The computer program product includes instructions that, when executed by a processor of a server computing device, cause the server computing device to generate security requirements for a software application under development based upon a plurality of technical attributes of the software application under development and a threat model associated with the software application under development. The server computing device creates a first set of development tasks in a software development issue tracking platform based upon the generated security requirements. The server computing device scans source code associated with the software application under development to identify one or more security vulnerabilities associated with the source code. The server computing device creates a second set of development tasks in the software development issue tracking platform based upon the identified security vulnerabilities. The server computing device generates a security risk score for the software application under development based upon the generated security requirements and the identified security vulnerabilities. The server computing device deploys the software application under development to a production computing system upon determining that the security risk score satisfies a predetermined criterion. The server computing device generates one or more security findings based upon operation of the software application after being deployed to the production computing system. The server computing device creates a third set of development tasks in the software development issue tracking system based upon the security findings.

Any of the above aspects can include one or more of the following features. In some embodiments, generating security requirements for the software application under development comprises: generating the threat model for the software application under development based upon the plurality of technical attributes, the threat model comprising one or more security threats existing in the software application under development; determining an initial set of one or more security requirements for the software application under development based upon the plurality of technical attributes, each security requirement associated with a mitigation plan that, when implemented in the software application under development, resolves a security threat; correlating the initial set of security requirements to one or more of the security threats in the threat model to determine which of the security threats are mitigated by the mitigation plan; and generating a final set of security requirements based upon the security threats left unmitigated. In some embodiments, creating the first set of development tasks in the software development issue tracking platform comprises identifying the mitigation plans corresponding to the security requirements in the final set of security requirements; converting each mitigation plan into one or more development tasks; and transmitting the one or more development tasks to the software development issue tracking platform to create the first set of development tasks.

In some embodiments, scanning source code associated with the software application under development to identify one or more security vulnerabilities associated with the source code comprises parsing lines of code in one or more source code modules to identify a first set of security vulnerabilities; analyzing one or more open source libraries associated with the software application under development to identify a second set of security vulnerabilities; testing one or more external interface components associated with the software application under development to identify a third set of security vulnerabilities; and aggregating the first set of security vulnerabilities, the second set of security vulnerabilities, and the third set of security vulnerabilities into a final set of security vulnerabilities. In some embodiments, the server computing device recognizes one or more of the final set of security vulnerabilities as critical vulnerabilities and prevents a build of the software application under development based upon the critical vulnerabilities.

In some embodiments, deploying the software application under development to a production computing system further comprises deploying the software application under development to the production computing system upon determining that the development tasks in the first set of development tasks have been completed in the software development issue tracking platform. In some embodiments, the server computing device captures security training data associated with one or more developers working on the software application under development; determines a training gap based upon the security training data; and creates a development task in the software development issue tracking platform based upon the training gap.

Other aspects and advantages of the invention will become apparent from the following detailed description, taken in conjunction with the accompanying drawings, illustrating the principles of the invention by way of example only.

BRIEF DESCRIPTION OF THE DRAWINGS

The patent or application file contains at least one drawing executed in color. Copies of this patent or patent application publication with color drawings will be provided by the Office upon request and payment of the necessary fee.

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 is a table comprising $N(N-1)/2$ ratios for a set of N weights.

DETAILED DESCRIPTION

Figure 1:
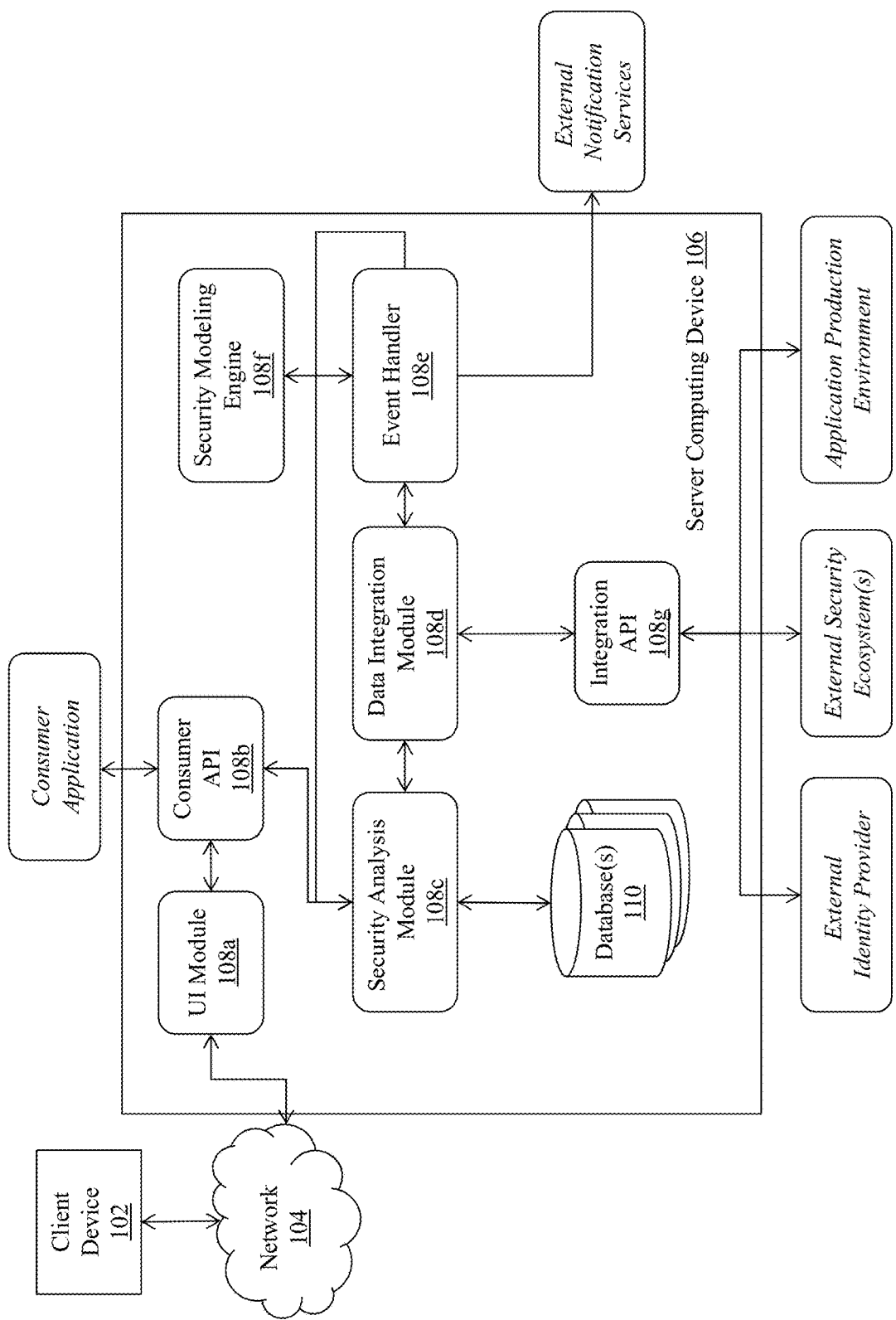
FIG. 1 is a block diagram of a system for automated secure software development management, risk assessment, and risk remediation.

FIG. 1 is a block diagram of a system 100 for automated secure software development management, risk assessment, and risk remediation. The system 100 includes client device 102 that is coupled via communications network 104 to server computing device 106. The server computing device 106 includes a user interface (UI) module 108a, a consumer application programming interface (API) 108h, a security analysis module 108c, a data integration module 108d, an event handler 108e, a security modeling engine 108f, and an integration API 108g. The server computing device 106 also includes one or more databases 110.

The client computing device 102 connects to the communications network 104 in order to communicate with the server computing device 106 to provide input and receive output relating to the process of automated secure software development management, risk assessment, and risk remediation as described herein. The client computing device 102 is coupled to a display device (not shown). For example, client computing device 102 can provide a detailed graphical user interface (GUI) via the display device that presents output resulting from the methods and systems described herein, where the GUI is utilized by an operator to review data associated with the automated secure software development management, risk assessment, and risk remediation process.

Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client device 102, it should be appreciated that the system 100 can include any number of client devices.

The communication network 104 enables the other components of the system 100 to communicate with each other in order to perform the process of automated secure software development management, risk assessment, and risk remediation as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware, including one or more special-purpose processors and one or more physical memory modules, and specialized software modules—such as modules 108a-108g—that execute on the processor of the server computing device 106, to receive data from other components of the system 100, transmit data to other components of the system 100, and perform functions for automated secure software development management, risk assessment, and risk remediation as described herein. As mentioned above, the processor of the server computing device 106.

In some embodiments, the modules 108a-108g are specialized sets of computer software instructions programmed onto a dedicated processor in the server computing device 108 and can include specifically-designated memory locations and/or registers for executing the specialized computer software instructions. Further explanation of the specific processing performed by the modules 108a-108g will be provided below.

The database(s) 110 comprise transient and/or persistent memory for data storage, that is used in conjunction with the automated secure software development management, risk assessment, and risk remediation process described herein. Generally, the databases 110 are configured to receive, generate, and store specific segments of data relating to the process of automated secure software development management, risk assessment, and risk remediation as described herein. In some embodiments, all or a portion of the databases 110 can be integrated within the server computing device 106 (as shown in FIG. 1) or be located on a separate computing device or devices. For example, the databases 110 can comprise databases such as MySQL™ available from Oracle Corp. of Redwood City, Calif. Also, as shown in FIG. 1, certain modules in the server computing device can be coupled (via network) to one or more external applications, services, providers, and/or ecosystems—as will be described in detail below.

Figure 2:
FIG. 2 is a flow diagram of a computerized method of automated secure software development management, risk assessment, and risk remediation.

FIG. 2 is a flow diagram of a computerized method 200 of automated secure software development management, risk assessment, and risk remediation, using the system 100 of FIG. 1. Typically, security activities through the development lifecycle include training for members of the development team, architecture and design analysis to determine security requirements, varies types of security scans, penetration testing, and ongoing operational monitoring. The system described herein connects these activities into one single platform, and integrates them directly with the development backlog. Additionally, the system creates three automated security gates that ensure the security activities are completed without the need for manual inspection, and therefore removing any traditional bottleneck from the security team.

These three gates are:
Gate A—Security Design Gate;
Gate B—Security Implementation Gate;
Gate C—Security Release Gate.

An objective of Gate A is to ensure all required and applicable security requirements are in the development backlog, and that all necessary plan work such as training is complete, before or around the time that development starts. As part of this process, the server computing device 106 generates (202) security requirements for a software application under development based upon a plurality of technical attributes of the software application under development and a threat model associated with the software application under development. The data integration module 108d connects via the integration API 108g to certain external security ecosystems, such as data sources and applications, to retrieve technical attributes associated with the software application being developed.

The technical attributes can include, but are not limited to elements such as: application classification and business function; application type (e.g., mobile, web, desktop, API, database, mainframe, batch script); technology stack and technology version (e.g., Java, Javascript [Node.js], iOS [Objective-C or Swift], Android, COBOL, .NET, Python, Ruby); data sensitivity and data access model; infrastructure and deployment model (e.g., traditional datacenter, on-premises virtual infrastructure [private cloud]; public cloud; third-party software-as-a-service (SaaS), and so forth.

The data integration module 108d further retrieves an application threat model, or in some cases, multiple threat models. The application threat model comprises a list of threats based on the technical attributes of the software application under development. The data integration module can have threat model information such as, but not limited to: threat attributes such as attack vectors, threat actors, threat targets, and the like. This information can affect the risk rating based on different factors including impact of potential breach/compromises, impact on users, reputation, etc. Per each application threat model, there is base architectural information such as infrastructure and application components, threat information such as attack vectors, threat actors, threat targets, and the like.

In some embodiments, the threat model is generated using any of a number of different methodologies, such as Open Web Application Security Project (OWASP) or Microsoft STRIDE. Each threat model also contains information on remediation of security risks that correlates with the detailed security requirements.

The data integration module 108d also retrieves one or more security requirements from an external security requirements repository. The retrieved security requirements generally include all of the application security requirements as defined by, e.g., the application developers, testers, and/or other software security teams. Each security requirement is associated with a mitigation plan which, when implemented in the software application under development, will resolve or otherwise address a security risk raised by the security requirement. The security requirements can be correlated to one or more threats as defined by the threat model, so that the system can analyze which requirement, when implemented, will mitigate which threat, and therefore determine the applicable requirements for a given application (e.g., using the mitigation plan). Each requirement can be rated with priority such as High/Medium/Low, or Required/Desired.

The data integration module 108d also retrieves data relating to application implementation, in the format of code or as user input, the security controls that the application has already implemented, or the external security components and/or security services that the application is leveraging or plan to leverage as part of its implementation.

The data integration module 108d transmits the retrieved data to the security analysis module 108c, which analyzes the data to generate (202) the security requirements for the software application under development. For example, the security analysis module 108c uses the plurality of technical attributes to generate a new threat model and/or modify the threat model retrieved previously. The security analysis module 108c further correlates the initial set of security requirements (e.g., as retrieved from the external security ecosystem) to one or more of the security threats in the threat model to determine which of the security threats are mitigated by the mitigation plan associated with the security requirements. Then, the security analysis module 108c can generate a final set of security requirements based upon the security threats left unmitigated. For example, the security analysis module 108c can filter the retrieved security requirements for the software application under development to a subset of security requirements that when implemented, will specifically mitigate one or more threats in the threat model. In some instances, at least one or more of the retrieved security requirements may not be applicable to the software application under development, or one or more of the retrieved security requirements may already be implemented in the application. Therefore, the security analysis module 108c does not need to account for these security requirements in the automated secure software development management, risk assessment, and risk remediation process.

Once the security analysis module 108c has determined the final set of security requirements to be implemented in the software application under development, the security analysis module 108c creates (204) a first set of development tasks in a software development issue tracking platform based upon the generated final set of security requirements. In one example, the security analysis module 108c translates the set of security requirements into, e.g., a set of issues to be either stored in the database 110 (for retrieval by a software development issue tracking platform, such as JIRA) or transmitted to the software development issue tracking platform for integration into the development backlog (i.e., the set of tasks/jobs that the developers work on implementing in the code base of the application under development in order to resolve the underlying security risks associated with the security requirements). When one of these issues is addressed by the developers, the software development issue tracking platform marks the issue as closed and transmits a notification to the event handler 108e, which then instructs the security analysis module 108c to factor the notification information into a decision-making process on whether to deploy the code base and/or build for the software application to a production computing environment (as will be explained in more detail below).

In a related aspect, the data integration module 108d also captures security training data associated with, e.g., developers and other personnel that are implementing the software application under development. For example, certain developers may have specific security training or certification, while others may not have the same level of experience or skills—which could pose security risks in the context of the code base of the software application being developed. All of this security training data can be stored in user profiles (e.g., in an HR system) or other types of data structures, and the data integration module 108d can retrieve this data from, e.g., an external identity provider. The security analysis module 108c can analyze the security training data associated with one or more aspects of the software application under development (e.g., by analyzing the training data for developers working on that aspect of the application) and the module 108c can determine a training gap based upon the security training data. For example, the module 108c can identify that one or more employees working on a single-sign-on (SSO) feature of the application do not have sufficient training in authentication algorithms or encryption functionality that could pose a security risk if those technologies are not properly implemented in the code base. As a result, the module 108c can create a development task in the software development issue tracking platform based upon the training gap (e.g., assign an experienced developer to review the source code and/or rework the source code to identify and remediate any security issues relating to the SSO implementation). In some cases, the security analysis module 108c can mark a training deficiency as a gating issue—which may prevent a build that includes the in-question functionality from being deployed to the production computing environment.

Next, the system 100 progresses to Gate B—the Security Implementation Gate. An objective of Gate B is to ensure that automated security analysis is performed during implementation and integration of the software application code base, the results are captured, and any security findings are mitigated. In this phase, the security analysis module 108c coordinates the performance of a number of security analyses on the software application being built, at the coding stage (e.g., implementation and integration). Typically, these analyses include, but are not limited to:

Open Source Security Software (OSSS) analysis—to scan the open source libraries and components included in the application, to identify both known vulnerabilities and licensing issues per corporate policies;

Static Application Security Testing (SAST)—to scan the application code and perform a white-box security testing, identify security issues at the code level;

Dynamic Application Security Testing (DAST)—to scan the application from an external perspective and perform a black-box security testing, identify security issues at the end-user level.

Turning back to FIG. 2, the security analysis module 108c scans (206) source code associated with the software application under development to identify one or more security vulnerabilities associated with the source code. To accomplish this, the security analysis module 108c coordinates the execution of multiple automated software scanning tools to conduct the above analyses, and the data integration module 108d captures feedback data via the integration API 108g, to gather the security vulnerabilities identified by these tools.

For example, the security analysis module 108c can execute one or more tools to parse lines of code in one or more source code modules to identify a first set of security vulnerabilities. The module 108c can further analyze one or more open source libraries associated with the software application under development to identify a second set of security vulnerabilities. Then, the module 108c can test one or more external interface components associated with the software application under development to identify a third set of security vulnerabilities. Finally, the module 108c aggregates the first set of security vulnerabilities, the second set of security vulnerabilities, and the third set of security vulnerabilities into a final set of security vulnerabilities.

The security analysis module 108c analyzes and de-duplicates the security vulnerabilities to derive a consolidated and correlated list of security vulnerabilities—from which the security analysis module 108c creates (208) a second set of development tasks in the software development issue tracking platform. In one example, the security analysis module 108c translates the security vulnerabilities into, e.g., a set of issues to be either stored in the database 110 (for retrieval by the software development issue tracking platform) or transmitted to the software development issue tracking platform for integration into the development backlog. In some cases, the event handler module 108e can further transmit notifications to the development team as new security vulnerabilities are identified. Also, the security analysis module 108c can recognize one or more of the final set of security vulnerabilities as critical vulnerabilities (e.g., by comparison to a vulnerability database) and preventing a build of the software application under development from being created and/or deployed based upon the critical vulnerabilities.

Based upon the generated security requirements and the identified security vulnerabilities as described above, the security modeling engine 108f generates (210) a security risk score for the software application under development. The security risk score is based upon a scoring mechanism referred to CARE—Continuous Application Risk Evaluation. The security risk score measures a software application's maturity and security on an ongoing basis, and the score can be updated in near real time based on events and/or at a scheduled frequency. The score provides a holistic measurement of multiple aspects that contributes to the overall risk of a software product:

Application Design—including information on the classification of application as well as its logical and physical architecture design. It addresses questions such as:
i. Is the application internal or external facing?
ii. How many users?
iii. What level of confidentiality is the data that the application handles?
iv. Is the application developed in Java? Which version?
v. Does it run on Windows or Linux? What version?

Findings from security testing—vulnerabilities identified by automated or manual security testing such as a static security code analysis, penetration testing, or equivalent.

Secure Software Development Lifecycle (SDLC) maturity—measuring the development team's process maturity. That is, whether or not the team performing all the activities and best practices to ensure security is built into the product.

Typically, when a software application has a low number of security vulnerabilities identified by such automation tools, it can be thought that the application is secure. With the increasing number of zero-day vulnerabilities being discovered on a regular basis, this cannot be the only measure. It could be luck or just a matter of time. This can be further qualified by examining the Application Design and the development team's Secure SDLC process maturity.

On the other hand, if an application team reports that they are doing everything they possibly can in the Secure SDLC process, such as running all the necessary security testing, but the application ends up having a large number of vulnerabilities, it reveals deficiency in their process such that the work performed is not effective.

Therefore, by combining measurements across the above three domains, the security risk score is effectively a single metric for a consistent measurement of security risk across multiple applications in the entire enterprise ecosystem. As a result, a software application can only achieve the highest score if it performs well in all three domains. It should be appreciated that other categories may be defined and added in the future. All these categories together are expected to give an overall presentation about how the application and the application team perform in regards to application security standards.

The following is an exemplary implementation of the security risk score:

The overall final score is a combination of three Domain Scores and an offset, defined as:
Domain Score 1: Technology Risk;
Domain Score 2: Technical Debt (i.e. Outstanding Security Findings);
Domain Score 3: Team Maturity (i.e. Secure Development Process); and
Offset.

The mathematical representation of the overall score function is defined as:

$$S=R_{min}+S_R+S_D+S_M+\Delta$$

whereas $R_{min}$ is the Minimum of the Defined Range, as specified in the next section;
$S_R$, $S_D$, $S_M$ are Domain Score functions as defined below;
R stands for risk;
D is technical debt, concerning vulnerabilities;
M is maturity, concerning Secure Software Development Life Cycle; and
i is offset.

Each Domain Score is calculated via a separate function described in the corresponding sections below.

Format of the Domain Score Sections

Each of the sections describing the corresponding Domain Scores is structured as such:
General high level description of the Domain;
Primary score calculation using primary factors;
Derived score calculation taking into account any additional influencer or validator—to ensure the necessary checks and balances are in place to maximum objectivity and coverage. This step can be optional during actual implementation; and Final score, within the defined weight for specified domain and range of total score.

Range, Effective Range, Midpoint, and Positive Mark

The Range for the score is user defined, whereas the Effective Scoring Range is defined as:

$$R_e = R_{max} - R_{min}$$

And, the Midpoint of the range and Positive Marker of the range are defined as:

$$\text{Midpoint} = R_{min} + \frac{R_e}{2}$$

$$\text{Positive} = R_{min} + R_e \cdot (w_R + w_D)$$

where $w_R$ and $w_D$ are the maximum score weights of Risk and Technical Debts.

For example, if a range between 200-1000 is chosen, the range is defined as:

$$R_{min} = 200$$

$$R_{max} = 1000$$

$$R_e = 1000 - 200 = 800$$

Weight

Wherever a weighted score is needed, the Weight, in percentage (%) is calculated via an algorithm of pair-wise comparison, unless otherwise specified.

Pair-wise comparison has two advantages:

Greater accuracy is easier to achieve by a comparison between two elements than that among all elements.

The existing weights should be adaptable to new weighting. Pair-wise comparison results in a two-element ratio, which does not change, no matter if the entire set of weights grows or shrinks.

The algorithm can be illustrated as follows. For a set of N weights, we can have N(N−1)/2 ratios as demonstrated in Table 1 shown in FIG. 5.

But only N−1 of them are independent to each other. These N−1 ratios give N−1 equations. Because all weights together must be normalized, there are actually N independent equations, and therefore the N weights are ready to be calculated out.

Given N−1 independent ratios, there is always a way to properly arrange the ratios such that they can be converted to N−1 equations. One way to arrange the N−1 equations is:

$$1 \cdot w_1 = a_2 w_2 = a_3 w_3 = \ldots = a_n w_n$$

Then, based on the normalization condition, the solution is:

$$w_1 = \frac{1}{1+b}; w_2 = \frac{a_2}{1+b}; w_3 = \frac{a_3}{1+b}; \ldots ; w_n = \frac{a_n}{1+b};$$

where $$b = \sum_{i=2}^{n} a_i$$

This weight calculation method is first used in calculating the score distribution among different domains that make up the total score, as seen above. This weight calculation method is further used in calculating the weight distribution of the security findings among different tools/sources.

Rating

Under this model:

Any score below midpoint is considered "insufficient" or "high risk," while

Any score above the positive mark is considered "sufficient" or "low risk."

Additionally, if Positive≤Midpoint, the weight distribution among the three domains is believed to be incorrect and should be re-calculated.

Domain Score 1—Technology Risk

The first domain score represents inherited technology risk that a software application may have. That is, risks introduced not by the development team through coding, but through: the selection of technology (e.g. architecture and programming language), combined with the infrastructure that the application runs on, and the security controls in place, or lack of, at the infrastructure level; the risk factor due to the type and business model of the application; and the scope of impact in terms of user population and revenue.

Update Frequency—once defined, this score is relatively static. It should be re-evaluated and updated on a quarterly basis, or whenever a new risk is discovered for the technology in use (e.g. a new zero-day vulnerability).

Primary Score, Factors and Formula

The primary factors of Technology Risk Score start with the application's Architecture, which serves as an initial score.

This base score is further modified by three factors—Infrastructure, Application Classification, and Scope of Impact. Each of the three factors is a function that yields a value between 0.1-2. At this point, the higher the number is, the higher the risk.

The modified score is then subtracted from a pre-defined constant value, base, to obtain the negated score, so that the higher the number is, the lower the risk. Zero is used if the number is lower than zero.

This primary formula of technology risk score is defined as:

$$S_R^{(p)} = \max\{0, \text{Base} - S_{ar} \cdot S_i \cdot S_{ac} \cdot S_s\} \cdot \frac{R_e}{\text{Base}}$$

where:

the superscript (p) stands for primary, and $$\frac{R_e}{\text{Base}}$$

is to scale the score to selected overall score range;

$0.1 \leq S_i \leq 2$ $0.1 \leq S_{ac} \leq 2$ $0.1 \leq S_s \leq 2$

Base=1000

In this formula, $S_{ar}$ is the initial score, caused by architectural risk:

$$S_{ar} = \sum_i M_i V_i \sum_j^{N_i} C_{ij} w_{ij}$$

For each index i, there are three metrics: C, M and V:

C is known risk in terms of CVE and CVSS score. It involves the following areas: programming language (e.g. Java, Node.JS); framework (e.g. Spring MVC, MEAN stack); code components/external libraries (e.g. encryption library);

platform (e.g. Websphere, Tomcat, Windows Server, RedHat).

M is maturity (e.g., number of years the technology is released to market);

V is official vendor support, as shown below in Table 2.

w is the weight based on the severity of each CVE according to the CVSS score.

TABLE 2

Architecture Metrics

| Metric | Key | Value | Weight |
|---|---|---|---|
| CVSS | Critical | 9.0~10.0 | 200% |
| | High | 7.0~8.9 | 200% |
| | Medium | 4.0~6.9 | 100% |
| | Low | 0~3.9 | 50% |
| Official vendor support | Yes | 1 | N/A |
| | No | 2 | N/A |
| Maturity | Year | $4.48e^{-1.5t}$ | N/A |

Figure 3:
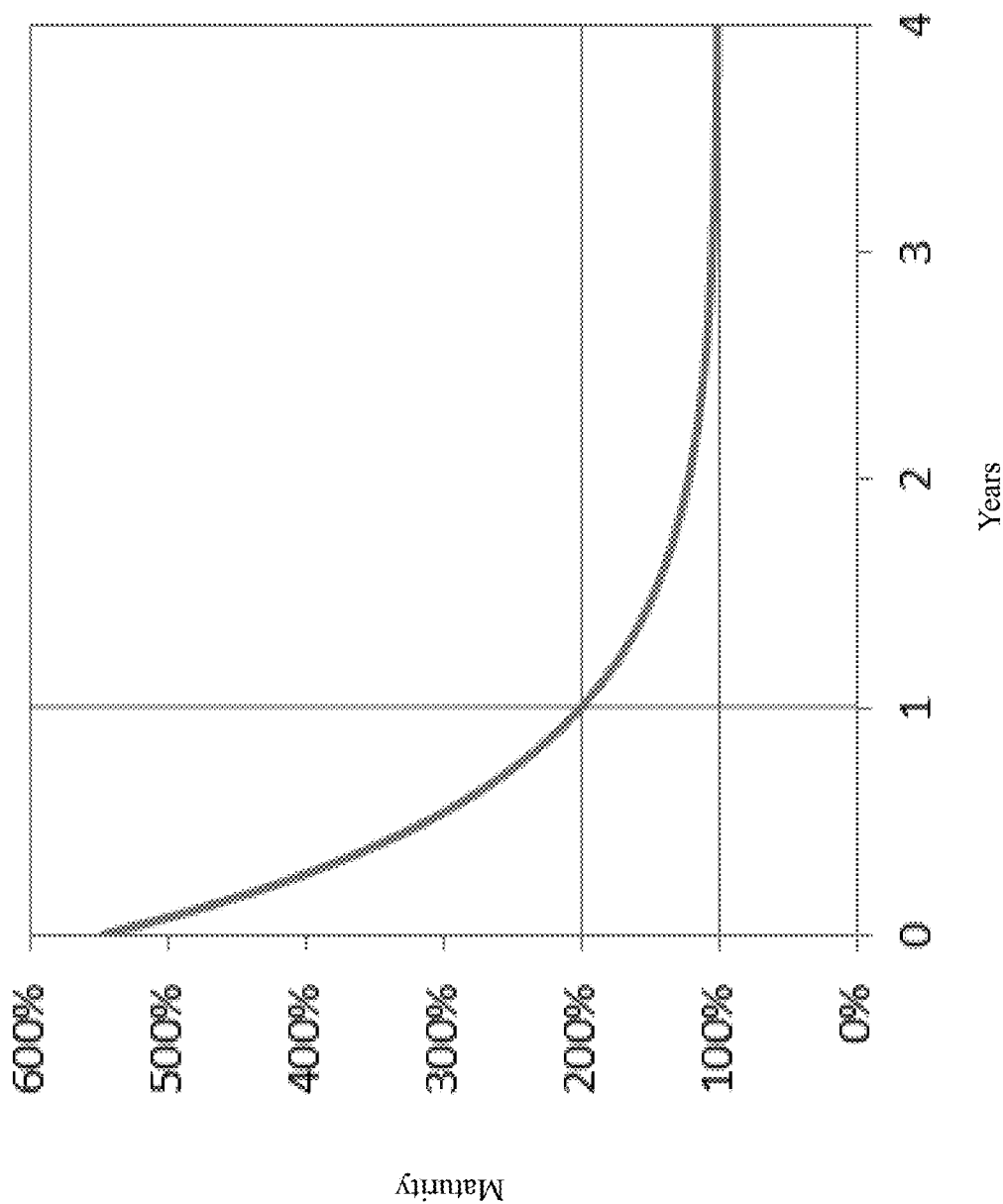
FIG. 3 is an exemplary graph depicting the value of maturity as being exponentially dependent on years.

The value of Maturity is exponentially dependent on years, as shown in the graph of FIG. 3.

Turning back to the primary formula of technology risk score defined above, $S_i$ is a function of infrastructure:

$$S_i = \frac{\text{Deploy model} + \text{Infrastructure Protection}}{100}$$

Detailed metrics for this equation are shown in Table 3 below:

TABLE 3

Infrastructure Metrics

| Metric | Key | Value |
|---|---|---|
| Deploy Model | Physical Data Center | 10 |
| | Private Cloud | 25 |
| | Public Cloud | 50 |
| WAF Protection | Yes | 10 |
| | No | 50 |
| DDoS Protection | Yes | 10 |
| | No | 50 |
| RASP Protection | Yes | 10 |
| | No | 50 |

Turning back to the primary formula of technology risk score defined above, $S_{ac}$ is a function of application classification:

$$S_{ac} = \frac{\text{Confidentiality} + \text{Integrity} + \text{Availablity} + \text{Audit} + Int/Ext}{100}$$

Detailed metrics for this equation are shown in Table 4 below:

TABLE 4

Application Classification Metrics

| Metric | Key | Value |
|---|---|---|
| Confidentiality | High | 40 |
| | Medium | 20 |
| | Low | 10 |
| Integrity | High | 40 |
| | Medium | 20 |
| | Low | 10 |
| Availability | High | 40 |
| | Medium | 20 |
| | Low | 10 |
| Audit | Yes | 40 |
| | No | 0 |
| Int/Ext | Int | 20 |
| | Ext | 40 |

Turning back to the primary formula of technology risk score defined above, $S_s$ is a function of impact scope:

$$S_s = \frac{\text{User Impact} + \text{Financial Impact}}{100}$$

where:

$$\text{User Impact} = \frac{\text{Number of } App \text{ Users}}{\text{Number of total customers}} \times 100$$

$$\text{Financial Impact} = \frac{\text{Annual Revenue of } App \text{ or } App \text{ Domain}}{\text{Business Annual Revenue}} \times 100$$

Adjusted Score using Additional Influencers and/or Validators

Because a software application is only as secure as its weakest point, the system takes into consideration of all dependency applications within the application ecosystem. If this application is dependent on other apps, and if their individual risk score is lower—thus represents a weaker point in the ecosystem—the system includes them to derive an average. A higher score is not considered because even though this app depends on it, it does not help reduce the risk.

Such additional correction can be expressed as:

$$S_R^{(a)} = \min\left\{S_R^{(p)}, \ \frac{1}{N+1}\left(S_R^{(p)} + \sum_{i=1}^{N} S_{R,i}^{(p)}\right)\right\}$$

where i runs through all other apps, if there are N other apps in the ecosystem. The superscript (a) stands for "adjusted score."

Optionally, the system may also include external scores into the average. For example: external assessment/audit scores, normalized to effective range; business unit/enterprise level assessment or risk score (e.g., BSIMM), normalized.

Final Score

Taking into consideration the above, the final score can be expressed as:

$$S_R = S_R^{(p)} \cdot w_R \text{ OR } S_R = S_R^{(a)} \cdot w_R$$

Domain Score 2—Security Findings/Technical Debt

The second domain score represents Introduced Risk of a particular application. That is, risks not inherited like in the first domain, but rather introduced by design and code. This identifies the security flaws and bugs that an application may have created during development.

Such security findings are identified through a variety of tools and/or processes, including but not limited to: code review; penetration testing; architecture review; fuzzing; binary instrumentation.

Update Frequency

This domain score should be updated in near real-time, as new security issues are identified via various process/tools and as existing findings get remediated and closed.

Primary Score, Factors and Formula

The primary formula for security findings/technical debt is expressed as:

$$S_D^{(p)} = \max\left\{0, \text{Base} - \sum_{i=1}^{n} F_i \cdot S_i \cdot A_i \cdot w_i\right\} \cdot \frac{R_e}{\text{Base}}$$

where:
the superscript (p) stands for primary;
the subscript i stands for a finding, and runs through all findings;
Base=100;
F is the score from SAST, DAST, IAST, Prod Incidents, and 3rd Party;
S is metric severity;
A is metric age which is given by the following formula:

$$A = \begin{cases} 200\% - a\, e^{-\lambda t}; & \text{if } t > t_1 \\ a e^{-\lambda(2t_1 - t)}; & \text{otherwise} \end{cases}$$

where $$\lambda = \frac{2 \cdot \ln 10}{t_2 - t_1}$$

$$a = 10^{\frac{2t_1}{t_2 - t_1}}$$

$t_1$: is the number of tolerance days, at which A=100%
$t_2$: is the number of industrial remedial days at which A=200%.

Figure 4:
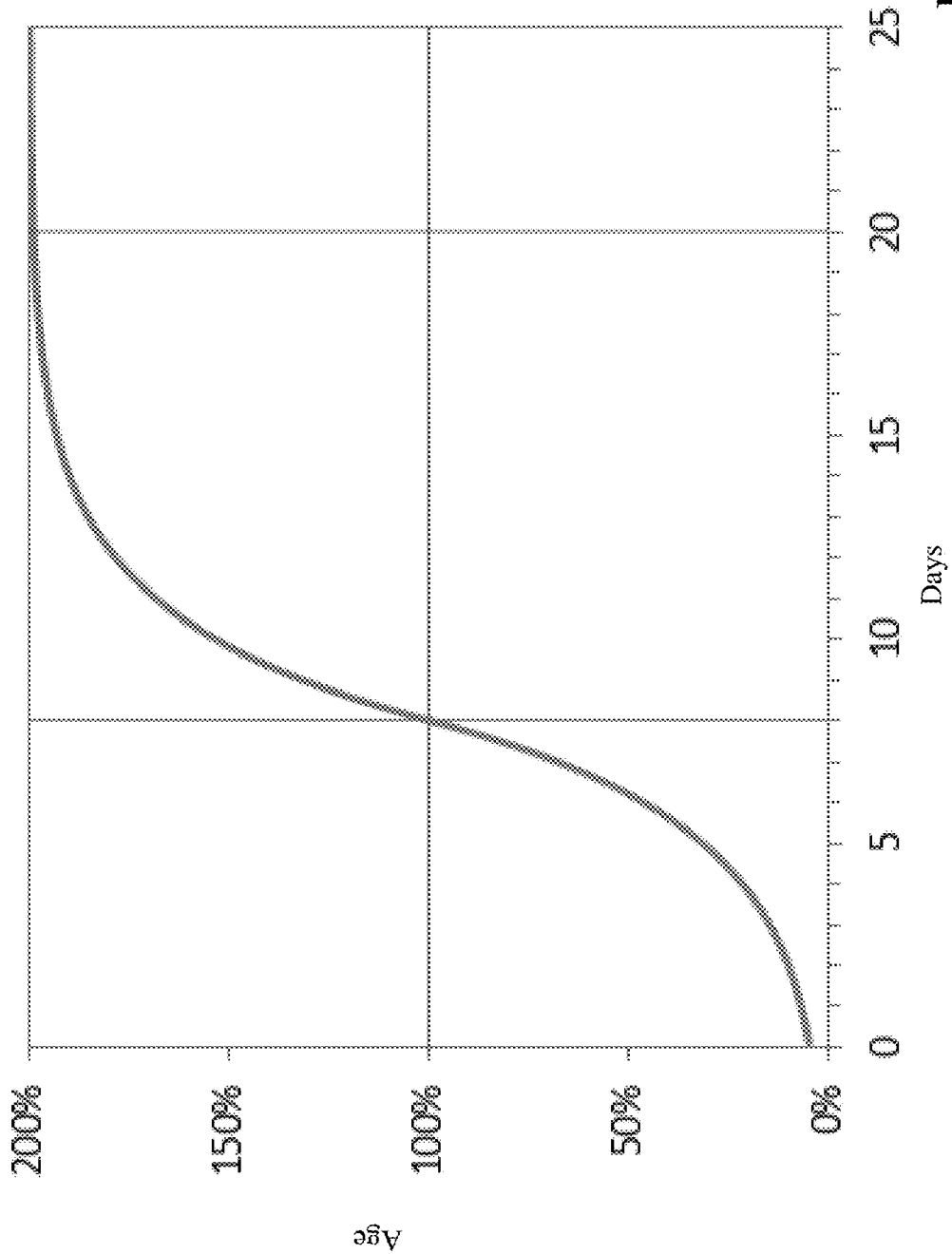
FIG. 4 is an exemplary graph depicting the exponential behavior of age as a function of days.

A graph showing the exponential behavior of age as a function of days is provided in FIG. 4, with example values of $t_1=8$ and $t_2=20$.

As the weight of finding i, $w_i$ has its default value 100%, and is adjustable by user within a range of 50%-150%.

Adjusted Score using Additional Influencers and/or Validators $S_D^{(a)}$=some small modification of $S_D^{(p)}$ Similar to Domain 1, this score can be adjusted based on additional factors such as application context. For example, an application has several CSRF and XSS vulnerabilities. If the application is a Stock Watch List app, it is at lower risk compared to a Stock Trading app.

Final Score

Taking into consideration the above, the final score can be expressed as $S_D = S_D^{(p)} \cdot w_D$ OR $S_D = S_D^{(a)} \cdot w_D$ Domain Score 3—Team Maturity (SSDLC Process)

The third and last domain score measures Process and Behavior. It takes into consideration multiple disciplines within the Secure Software Development Life Cycle (SSDLC).

For example, we may define eight disciplines to build security into every stage of the development life cycle. Each discipline contains a list of sub-requirements with specific measurement criteria. We score on the completion of these sub-requirements to measure the implementation of the SSDLC for the application.

The 8 disciplines and sub-requirements are defined and measured as follows:
1. Security Planning & Analysis
   a. There are a number of role-based security trainings available in the firm. The system measures the % of people on the application team who have received required security trainings. (%)
   b. The enterprise risk and security team has a standard risk rating system that rates the risks of applications across the firm. The system checks if the application has registered with the system and has a risk rating assigned. (Binary)
2. Security Features & Requirements
   a. There are twelve predefined security stories that serve as the baseline security requirements for the applications. The system measures the % of these stories that are included into the application's backlog. (%)
3. Architecture & Design
   a. The application architect should always include the Data Flow Analysis in the design. (Binary)
   b. The security analyst should perform threat modeling analysis on the application. (Binary)
   c. Review security design as part of the architecture review. (Binary)
   d. The application should always use the approved security modules and services. The system measures the % of these modules being used in the application. (%)
4. Secure Coding
   a. The application developers should use IDE plugins, such as SecureAssist, to follow security coding guidance. The system measures the % of developers who utilize the IDE plugins. (%)
   b. The application should employ static analysis tools (SAST), such as HP Fortify, as part of the Jenkins continuous integration build environment. (Binary)
   c. The application should employ interactive application security tools (LAST), such as Contrast, to provide real-time vulnerability reporting and monitoring. (Binary)
5. Security Testing
   a. The QA team should include security requirements as part of "definition of done" in the application stories and create corresponding security test cases. The system measures the % of stories that have security test cases. (%)
   b. The penetration testing team should perform security testing for the application on a regular basis. (Binary)
6. Integration & Deployment
   a. The application should employ security gates (e.g. secure code review) as part of the deployment process. (Binary)
   b. The application should employ malicious code detection process as part of the deployment process. (Binary)
   c. The application should employ approved security deployment checklist (e.g. remove application backdoors, change production credentials) as part of the deployment process. (Binary)

7. Continuous Monitoring & Response
   a. The application should employ a centralized logging system, such as Splunk, for application logs. (Binary)
   b. The application should have standard incident response processes defined. (Binary)
8. Attack Profiling & Intelligence
   a. The enterprise security team should employ real-time intelligence analysis tools, such as RecordedFuture, to analyze the emerging threats on the application. (Binary)

Update Frequency

This score should be updated on demand, depending on the frequency of changes to the development team. In an agile development world, this score should be updated at the beginning or end of each Sprint.

Primary Score, Factors and Formula

Given a discipline D, there are M sub-requirements, where each is measured by either a % value or by a binary decision (Y/N). The system normalizes the binary decision as Y–100% and N–0%. Thus the % value of a sub-requirement is denoted as R. Across all eight disciplines, every discipline has a predefined weight, defined as $w_D$. Similarly, across all sub-requirements under a discipline, every sub-requirement has a weight, defined as $w_R$.

The primary score for Team Maturity, $S_M^{(p)}$, can be calculated as:

$$S_M^{(p)} = R_e \cdot \sum_{i=1}^{n} w_{Di} \cdot \sum_{j=1}^{M_i} w_{Rj} \cdot R_j \quad (16)$$

where:
p stands for primary score;
$w_{Di}$ is the weight for discipline $D_i$;
$M_i$ is the number of sub-requirements under discipline $D_i$;
$R_j$ is the actual value or % for sub-requirement j;
$w_{Rj}$ is the weight for sub-requirement j under discipline $D_i$ Adjusted Score Using Additional Influencers and/or Validators As application security is viewed as part of the overall application quality, the system takes into consideration generic quality control measures to adjust the team maturity scores. Low code quality, low QA code coverage, and/or high QA defect rates has a negative impact on the score.

The security skillsets of the team, on the contrary, will positively impact the team's maturity. Team members could obtain internal or external security professional certifications. The more certified security professionals there are in the team, the more likely the team could avoid introducing security vulnerabilities.

The adjustment on the primary score is based on the formula:

$$S_M^{(a)} = S_M^{(p)} + (A - Q + T) \cdot R_e \cdot w$$

where:
Q stands for code quality issues calculated by $$Q = \frac{QA \text{ code quality issue rate} + QA \text{ defect rate}}{QA \text{ code coverage }\%}$$

A stands for the ratio of Certified Associates to total associates;

T is the length of the history the team has, calculated as:

$$T = \frac{\text{Average Historic Score} - \text{Positive}}{R_{max}} \cdot \text{number of years of history}$$

$R_e$ is the effective range;
w is the overall % of impact over the effective range of additional influencers.

Final Score

Taking into consideration the above, the final score can be expressed as $$S_M = S_M^{(p)} \cdot w_M \text{ OR } S_M = \min\{S_M^{(a)}, R_e\} \cdot w_M$$

Offset Calculation

Offset is an optional calculation designed to allow teams with higher SSDLC maturity (i.e. receiving a score higher than the allowed maximum in Domain Score 3) to minimize the impact of inherited risk, if an undesirable score is obtained in Domain Score 1, usually through no fault of the development team.

There are two exemplary ways of calculating the offset.

First, if a derivative score is calculated as part of Domain Score 1 (e.g. taken into consideration dependency apps and/or external audits) and as a result a lower final score is obtained, then the difference of the derived score and original score may be recovered by this offset, defined as:

$$\Delta = \max\{0, \min\{(S_R^{(p)} - S_R^{(a)}) \cdot w_R, (S_M^{(a)} - S_M^{(p)}) \cdot w_M,\}\}$$

Alternatively, a simpler calculation may be desired such that a small portion of the Domain Score 1 may be recovered, defined as:

$$\Delta = R_e \cdot w_R \cdot p$$

where p is the proposed predefined percentage which is recommended to be no more than 20%.

Next, the system 100 progresses to Gate C—the Security Deployment Gate and Continued Feedback Loop. An objective of Gate C is to ensure that no critical security issue is release to production for any given software application.

With each new event at the development stage, the security modeling engine 108f calculates a new forecast CARE score. The forecast CARE score takes into account a) the pre-release findings identified during development that are not yet released into production, and b) the long-term credibility of this development team to remediate any security issue in a timely manner (by evaluating both the historic CARE scores of this application as well as the team's current Secure SDLC maturity).

The forecast CARE score is used to determine whether or not an application can automatically pass the "release gate" without manual review and sign off from the security team. This phase is called this the "software security pre-check". Moreover, a passing score is predetermined and agreed to by both the security team and the development team. If at time of release, the forecast CARE score is above this predetermined threshold, the data integration module 108d notifies the production deployment system (such as IBM uDeploy) to release the code to production.

Turning back to FIG. 2, the data integration module 108d utilizes the integration API 108g to deploy (212) the software application under development to a production computing system upon determining that the security risk score satisfies a predetermined criterion. For example, the data integration module 108d communicates with, e.g., a source code versioning and build generation system to instruct that system to deploy a current build of the software application under development to the production environment. One example includes triggering a Jenkins build. The system can start a Jenkins build by triggering the Jenkins server, which is connected to source code. The Jenkins server can build the source code and even deploy via a build/deploy script.

Once the software application is released to the production environment, the security analysis module 108c automatically marks any remaining non-critical security findings that are identified during pre-release stage, as 'in production,' and the module 108c transmits these security findings to, e.g., a centralized enterprise vulnerability management system, if one is available, via the data integration module 108d. Additionally, the security analysis module 108c generates (214) security findings identified by post-release security activities, such as penetration testing or ongoing security monitoring, after the software application under development has begun operating in the production computing environment. The data integration module 108d captures the security findings and creates (216) a third set of development tasks in the software development issue tracking system based upon the generated security findings, therefore completing the feedback loop automatically to the development team. Depending on the software development issue tracking system used and integrated with, the present system can call the issue tracking system's API and generate stories/issues in the issue tracking system that reflect the security findings.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automated secure software development management, risk assessment, and risk remediation, the system comprising a server computing device that:
   generates security requirements for a software application under development based upon a plurality of technical attributes of the software application under development and a threat model associated with the software application under development, including:
      generating the threat model for the software application under development based upon the plurality of technical attributes, the threat model comprising one or more security threats existing in the software application under development,
      determining an initial set of one or more security requirements for the software application under development based upon the plurality of technical attributes, each security requirement associated with a mitigation plan that, when implemented in the software application under development, resolves a security threat,
      correlating the initial set of security requirements to one or more of the security threats in the threat model to determine which of the security threats are mitigated by the mitigation plan, and
      generating a final set of security requirements based upon the security threats left unmitigated;
   creates a first set of development tasks in a software development issue tracking platform based upon the generated security requirements;
   scans source code associated with the software application under development to identify one or more security vulnerabilities associated with the source code;
   creates a second set of development tasks in the software development issue tracking platform based upon the identified security vulnerabilities;
   generates a security risk score for the software application under development based upon the generated security requirements and the identified security vulnerabilities;
   deploys the software application under development to a production computing system upon determining that the security risk score satisfies a predetermined criterion;
   generates one or more security findings based upon operation of the software application after being deployed to the production computing system; and
   creates a third set of development tasks in the software development issue tracking system based upon the security findings.

2. The system of claim 1, wherein creating the first set of development tasks in the software development issue tracking platform comprises:
   identifying the mitigation plan corresponding to the security requirements in the final set of security requirements;
   converting each mitigation plan into one or more development tasks; and
   transmitting the one or more development tasks to the software development issue tracking platform to create the first set of development tasks.

3. The system of claim 1, wherein scanning source code associated with the software application under development to identify one or more security vulnerabilities associated with the source code comprises:
   parsing lines of code in one or more source code modules to identify a first set of security vulnerabilities;
   analyzing one or more open source libraries associated with the software application under development to identify a second set of security vulnerabilities;
   testing one or more external interface components associated with the software application under development to identify a third set of security vulnerabilities; and
   aggregating the first set of security vulnerabilities, the second set of security vulnerabilities, and the third set of security vulnerabilities into a final set of security vulnerabilities.

4. The system of claim 3, wherein the server computing device
   recognizes one or more of the final set of security vulnerabilities as critical vulnerabilities; and
   prevents a build of the software application under development based upon the critical vulnerabilities.

5. The system of claim 1, wherein deploying the software application under development to a production computing system further comprises deploying the software application under development to the production computing system upon determining that the development tasks in the first set of development tasks have been completed in the software development issue tracking platform.

6. The system of claim 1, wherein the server computing device
captures security training data associated with one or more developers working on the software application under development;
determines a training gap based upon the security training data; and
creates a development task in the software development issue tracking platform based upon the training gap.

7. A computerized method of automated secure software development management, risk assessment, and risk remediation, the method comprising:
generating, by a server computing device, security requirements for a software application under development based upon a plurality of technical attributes of the software application under development and a threat model associated with the software application under development, including:
generating, by the server computing device, the threat model for the software application under development based upon the plurality of technical attributes, the threat model comprising one or more security threats existing in the software application under development,
determining, by the server computing device, an initial set of one or more security requirements for the software application under development based upon the plurality of technical attributes, each security requirement associated with a mitigation plan that, when implemented in the software application under development, resolves a security threat,
correlating, by the server computing device, the initial set of security requirements to one or more of the security threats in the threat model to determine which of the security threats are mitigated by the mitigation plan, and
generating, by the server computing device, a final set of security requirements based upon the security threats left unmitigated;
creating, by the server computing device, a first set of development tasks in a software development issue tracking platform based upon the generated security requirements;
scanning, by the server computing device, source code associated with the software application under development to identify one or more security vulnerabilities associated with the source code;
creating, by the server computing device, a second set of development tasks in the software development issue tracking platform based upon the identified security vulnerabilities;
generating, by the server computing device, a security risk score for the software application under development based upon the generated security requirements and the identified security vulnerabilities;
deploying, by the server computing device, the software application under development to a production computing system upon determining that the security risk score satisfies a predetermined criterion;
generating, by the server computing device, one or more security findings based upon operation of the software application after being deployed to the production computing system; and
creating, by the server computing device, a third set of development tasks in the software development issue tracking system based upon the security findings.

8. The method of claim 7, wherein creating the first set of development tasks in the software development issue tracking platform comprises:
identifying, by the server computing device, the mitigation plans corresponding to the security requirements in the final set of security requirements;
converting, by the server computing device, each mitigation plan into one or more development tasks; and
transmitting, by the server computing device, the one or more development tasks to the software development issue tracking platform to create the first set of development tasks.

9. The method of claim 7, wherein scanning source code associated with the software application under development to identify one or more security vulnerabilities associated with the source code comprises:
parsing, by the server computing device, lines of code in one or more source code modules to identify a first set of security vulnerabilities;
analyzing, by the server computing device, one or more open source libraries associated with the software application under development to identify a second set of security vulnerabilities;
testing, by the server computing device, one or more external interface components associated with the software application under development to identify a third set of security vulnerabilities; and
aggregating, by the server computing device, the first set of security vulnerabilities, the second set of security vulnerabilities, and the third set of security vulnerabilities into a final set of security vulnerabilities.

10. The method of claim 9, further comprising:
recognizing, by the server computing device, one or more of the final set of security vulnerabilities as critical vulnerabilities; and
preventing, by the server computing device, a build of the software application under development based upon the critical vulnerabilities.

11. The method of claim 7, wherein deploying the software application under development to a production computing system further comprises deploying the software application under development to the production computing system upon determining that the development tasks in the first set of development tasks have been completed in the software development issue tracking platform.

12. The method of claim 7, wherein the server computing device
capturing, by the server computing device, security training data associated with one or more developers working on the software application under development;
determining, by the server computing device, a training gap based upon the security training data; and
creating, by the server computing device, a development task in the software development issue tracking platform based upon the training gap.

13. A computer program product, tangibly embodied in a non-transitory computer readable storage device, for automated secure software development management, risk assessment, and risk remediation, the computer program product including instructions that, when executed by a processor of a server computing device, cause the server computing device to:
generate security requirements for a software application under development based upon a plurality of technical attributes of the software application under development and a threat model associated with the software application under development, including:

generating the threat model for the software application under development based upon the plurality of technical attributes, the threat model comprising one or more security threats existing in the software application under development, determining an initial set of one or more security requirements for the software application under development based upon the plurality of technical attributes, each security requirement associated with a mitigation plan that, when implemented in the software application under development, resolves a security threat, correlating the initial set of security requirements to one or more of the security threats in the threat model to determine which of the security threats are mitigated by the mitigation plan, and generating a final set of security requirements based upon the security threats left unmitigated;

create a first set of development tasks in a software development issue tracking platform based upon the generated security requirements;

scan source code associated with the software application under development to identify one or more security vulnerabilities associated with the source code;

create a second set of development tasks in the software development issue tracking platform based upon the identified security vulnerabilities;

generate a security risk score for the software application under development based upon the generated security requirements and the identified security vulnerabilities;

deploy the software application under development to a production computing system upon determining that the security risk score satisfies a predetermined criterion;

generate one or more security findings based upon operation of the software application after being deployed to the production computing system; and create a third set of development tasks in the software development issue tracking system based upon the security findings.

* * * * *